United States Patent Office 3,640,984
Patented Feb. 8, 1972

3,640,984
POLYTETRAFLUOROETHYLENE
William A. Miller, Flemington, N.J., assignor to Allied
Chemical Corporation, New York, N.Y.
No Drawing. Filed Nov. 4, 1963, Ser. No. 321,353
Int. Cl. C08f 3/24
U.S. Cl. 260—92.1
17 Claims This invention relates to an improved ultrafine particle polytetrafluoroethylene (PTFE) and the preparation thereof, and more specifically, to ultrafine particle PTFE which is non-fibrous and porous and which has a high green preform strength and a low anisotropic expansion.

Ultrafine fibrous non-porous PTFE is well-known commercially and has been used in the production of thin sheeting; however, the anisotropic expansion of this ultrafine material is such that a high degree of shrinkage takes place on sintering, which, in turn, causes flaws in the manufacture of precision parts. Further, it is deficient in green preform strength for many applications. This weakness in preform strength leads to cracking on transportation from the mold to the sintering furnace; extensive scrap reworking due to cracking on removal from the mold; and fragility in the sintered article. Two sets of molds have been used for fabrication of precision parts in an attempt to improve the results from this material, but this procedure has been found to be unsatisfactory and uneconomical. In addition, the use of fibrous particles raises many additional problems which are due to the fibrous nature of the material such as agglomeration, reduction in flowability, bed voids, production of rough surfaces on molding, and lack of uniformity in the finished product.

In view of the above-mentioned problems, which have arisen in the use of commercial ultrafine fibrous PTFE, a need has risen for an ultrafine PTFE which has the advantages of the commercial material but avoids the disadvantages, i.e., there is a need for ultrafine non-fibrous PTFE which has a lower anisotropic expansion and a higher green preform strength. The fulfillment of this need is an object of this invention. A further object is to provide a material which, in addition to the above properties, has many additional advantages, such as possessing a high bulk density and being compressible at a low pressure to a dense preform of very low void content which is capable of being molded into thin sheets with a high degree of uniformity. Other objects and advantages will be apparent hereinafter.

In accordance with the invention, a process has been found by which a novel ultrafine polytetrafluoroethylene product is obtained by the following steps: (a) subjecting particles of polytetrafluoroethylene, which particles are at least 100 microns in their smallest dimension, to milling effected substantially solely by interparticulate collision, at a temperature of less than about 200° F.; (b) classifying the milled particles to separate therefrom particles having a maximum dimension of up to and including about 50 microns, wet-sieve size; and (c) subjecting the unseparated particles of larger than about 50 microns, wet-sieve size, repeatedly to the milling effected substantially solely by interparticulate collision, at a temperature of less than about 200° F.

The novel PTFE comprises porous, non-fibrous particles with rounded contours having a particle size no greater than 50 microns, wet-sieve size, said PTFE material having a distribution function of no greater than about .40, a sub-sieve size of no greater than about 5.0 microns, a ratio of wet-sieve size to sub-sieve size in the range of about 2 to about 10, unsintered flex strength of at least about 860 p.s.i., and, having, after sintering, a tensile strength of no less than about 4000 p.s.i., a percent elongation of no less than about 300, an anisotropic expansion factor of no greater than about 1.13, a dielectric strength of no less than about 1200 volts per mil, a surface roughness of no greater than about 82 microinches at 500 p.s.i. and no greater than 32 microinches at 2000 p.s.i., and a void content of no greater than 0.1% at pressures greater than 2000 p.s.i.

Definitions of the terms used herein are as follows:

"Particle size, wet-sieve": The size of the particle is measured by using wet-sieve analysis and the wet-sieve size refers to a measured particle diameter ($d_{ws}$) obtained by sieving the particles. The sieves used for making this size determination are the U.S. Standard sieves 230, 270, 325, and 400 mesh. 30 and 20 micron sieves are also used, such sieves not being ASTM screens, but rather Micromesh screens prepared by the Buckbee Mears Co. by a photographic process. The sieve openings of these screens are 62, 53, 44, 37, 30, and 20 microns. A 20 mesh sieve is stacked above one of the smaller mesh sieves. A 5 gram sample of powder is placed in the 20 mesh sieve and carefully washed onto the lower sieve by spraying with perchloroethylene for about 30 seconds at a rate of about 3 liters per minute, using a shower spray. The spray nozzle is held level with the top of the 20 mesh sieve and moved about in a circular manner, taking care to break up any aggregates and to wash material from the sides of the upper sieve. The upper sieve is then removed and the lower sieve is sprayed in the same day for about four minutes. Finally, the lower sieve is air-dried to constant weight, and the weight of dry powder retained thereon is measured. This series of operations is repeated with a fresh 5 gram sample of powder on each of the other small-mesh sieves. The weight of powder retained on each is multiplied by 20 to obtain cumulative weight percentage figures, which are then plotted against sieve-opening size on log probability paper. The best straight line is drawn through these points, and the particle sizes corresponding to cumulative percentages of 50 ($\bar{d}_{50}$) and 84 ($\bar{d}_{84}$) are read off. From these particle sizes the value $d_{ws}$ is calculated from the equation $$\log_e d_{ws} = \log_e \bar{d}_{50} - 0.5 \left( \log_e \frac{\bar{d}_{84}}{\bar{d}_{50}} \right)^2$$

This value thus corresponds to a measured diameter of the average particle, on the assumption that all particles are spherical.

"Sub-sieve size": This value is a measure of surface area. The value corresponds to the theoretical diameter of the average particle on the assumption that the particles are non-porous spheres. The smaller the number the larger the surface area. The method for determining sub-sieve size is a convenient and quick way of obtaining relative particle size. A small particle size with a high surface area is desirable since with the greater surface area, more uniform coalescence of the particles occurs on sintering. The value obtained refers to the calculated specific surface particle diameter ($d_{ss}$) as determined via the air permeability method using, for example, the "Subsieve Sizer," catalog number 14-312 of the Fisher Scientific Company. According to the air permeability method, air is passed upward through a layer of particles. Particles with a greater surface area will provide a greater resistance to the air. The resistance is measured and related to surface area, which, in turn, is related to particle size.

"Ratio wet-sieve/sub-sieve": This ratio is a measure of the extent to which the average particle departs from the spherical. The lower the ratio the more nearly spherical the particle and the greater degree of paritcle uniformity, which is important for maximum properties.

"Surface roughness": This is a measure of surface irregularities expressed in microinches. It can be determined by means of a Brush Surfindicator. Simply, a diamond stylus is passed over the surface of the sample in much the same way that a diamond stylus is passed through the grooves of a high fidelity phonograph record. The irregularities are amplified so that they are readily apparent on a meter attached to the instrument. The value is an average of microinch measurements over the surface of the specimen.

"Unsintered flex strength": This value is determined by the stress required for failure of an unsintered bar mold specimen. In order to test for flex strength, samples, typically, ½" x ½" x 5", are molded to a zero void content at 6,000 p.s.i. and stressed at a controlled rate to failure, i.e., increasing stress is placed at the center of the bar of the resin until it fractures. The flex strength is measured in p.s.i. at the point of fracture.

"Anisotropic expansion": This is a measure of the dimensional change obtained on sintering. The value is determined as follows: Four and one-tenth grams of powder is weighed into a half-inch square rectangular mold cavity and compressed between metal plugs. Pressure is built up to 2000 p.s.i. during one minute, held during two minutes, and then released. The roughly cubical preform is allowed to stand for 30 minutes. The width, breadth and height of hte preform are measured (i.e., the X, Y, and Z are axes, respectively), where Z is the axis compressed during preforming. The measured preforms are baked 30 minutes at 380° C.±0.5° C. to obtain a sintered piece, allowed to cool in air to room temperature, and remeasured. Anisotropic expansion factor is then value of $Z_s/Z_p$ divided by $$\frac{X_s+Y_s}{X_p+Y_p}$$

where X, Y, and Z are the axial measurements, subscripts $p$ and $s$ referring to preform and sintered piece, respectively. The dimensions of a fibrous material will change significantly on sintering whereas a non-fibrous material will change very little and, consequently, has a small anisotropic expansion.

"Distribution function": This is a measure of the width of particle distribution. Mathematically it is one sigma past the average particle size. The function is defined as $$D.F.=\frac{d_{50}-d_{84}}{d_{50}}$$

where $d_{50}$ is the particle size at 50% retention on a log-probability plot, and $d_{84}$ is the particle size at 84% retention. This function varies between 0 and 1. The smaller the number the narrower the distribution. Particles of one size have a 0 distribution function. The narrower the distribution the more uniform the physical properties. Slight differences are found to have a profound effect on these properties.

"Percent void content": This value is a measure of the residual entrapped air after powder preforming, typically at 2500 p.s.i., followed by sintering. It is a function of particle size and molding pressure and is determined according to the following equation:

Percent Void Content
$$=\frac{\text{Inherent Specific Gravity minus Measured Specific Gravity}}{\text{Inherent Specific Gravity}}\times 100$$

"Mold extension": This is a measure of mold flow and is determined as shown in Example IV, infra. Mold flow is the ability of the powder to move or flow in a direction perpendicular to the applied force. This flow aids in healing flaws.

"Dielectric strength": This value is determined using the apparatus and method described in ASTM test number D149. Tests were conducted on a 15 mil specimen.

"Compression ratio": This value is a measure of bulk density. It is the required fill depth needed to produce a 1 inch final molded object. The lower fill depth permits the use of shorter, lighter molds in the preparation of large billets.

"Tensile strength": This value is measured using ASTM test number D638.

"Yield strength": The same ASTM test is used as for "Tensile strength." The measurement in p.s.i. is made at the point where there is no elastic recovery of the material.

The process of my invention is carried out by feeding a commercial grade of granular PTFE (produced for example as in U.S. Pat. 2,393,967) having a particle size of over 100 microns into an air mill such as the "Jet-O-Mizer," manufactured by the Fluid Energy Processing & Equipment Company of Philadelphia, Pa. A high degree of interparticulate collision is accomplished by utilizing this type of air mill, which has the shape of a hollow elongated toroid. The mill stands vertically with one curved end at the top and the other curved end at the bottom so that the elongated sides, which are substantially parallel, are in a vertical position. The starting PTFE material is fed into the lower curved end of the mill. A grinding "fluid," such as air or an inert gas, e.g., $N_2$, argon, or fluorocarbons, is fed into the same end of the mill under high pressure to effect grinding of the feed particles by interparticulate collision.

The temperature is preferably held within the range of 0°–140° F. and is not permitted to rise above about 200° F. If the temperature of about 200° F. is exceeded, a fibrous material with a high anisotropic expansion is produced, but temperatures below room temperature and pre-chilling of the PTFE improves mill performance due to the increased brittleness of the resin.

The shape of the "Jet-O-Mizer" air mill can best be described by calling it a hollow elongated toroid. Starting material is fed into the lower end of the air mill through a venturi feeder. The lower end of the mill, which is the grinding chamber, has nozzles through which air or other grinding fluids are forced under high pressure. The expanded air causes repeated impact between the particles resulting in rapid size reduction. The particles are reduced by this impact and not by shearing, which would produce a fibrous particle, or abrasion with the mill walls. The grinding chamber can be described as having an inverted trapezoidal cross section. This cross section may be circular, but the efficiency is slightly reduced thereby. The material is forced from the grinding chamber through an "upstack," which is one of the straight elongated portions of the air mill, and fed into the upper curved section where classifying takes place. The walls of the classifier are shaped to a logarithmic, anti-friction curve. As the air stream with the material therein enters the classifying zone the small particles up to and including 50 microns, wet-sieve size, are removed and the larger particles are thrown to the outside by centrifugal force and remain in the air mill, returning to the grinding chamber by means of a "downstack" which is an elongated counterpart of the "upstack" and is substantially parallel thereto. The ultrafine particles, removed from the classifying portion of the air mill, are the finished product. An important aspect of this air mill is that the grinding and classifying take place in distinct sections. The grinding occurs at the air inlet nozzles where high acceleration is given to the particles. There the material is rapidly and efficiently reduced by the action of high velocity air jets. The reduction occurs from the high acceleration forces placed on the particles by the air jets to achieve particle to particle impact. Substantially all of the particle reduction is effected by interparticulate collision, i.e., at least 90% and, more generally, in excess of 94% of the particle reduction is effected by interparticulate collision. Very little of the size reduction occurs by abrasion with the mill walls. This can be shown by the low rate of wear on the mill linings even when used to reduce very abrasive materials. After the material passes from the grinding chamber and into the "upstack," it then enters the classification section which is of circular cross section where the finely milled particles are carried by the air stream from the mill. The partially milled material is thrown to the outer periphery by centrifugal force and returned to the grinding chamber. The classifying action is necessary not only to remove the fine particles, but to permit unimpeded impact to occur between the partially milled particles still retained in the mill. The final product can be removed from the air stream by means of a cyclone and bag collector.

Feed rate, feed size, air pressure, and air volume are controlled to achieve the desired average particle size up to and including 50 microns, wet-sieve size. A finer particle is obtained by feeding a finer feed material at a slower rate, with increased air pressure or air volume. In a "Jet-O-Mizer" Model 0202 air mill, an increase in feed rate from 8 to 12 lbs. per hour increases the average particle size from 20 to 30 microns. The effect of feed size is not as significant. Changing the feed size from 600 to 400 microns decreases the final particle size by only 4 to 6 microns. It is not practical to feed material coarser than 1500 microns into the air mill and feed size is preferably held in the range of 100–1000 microns. Material which is coarser than this can be first reduced to this stage by use of a hammer mill. Following the reduction in the hammer mill the material is then reduced to 50 microns or less in the air mill. Air pressure and air volume are a measure of the power input to the mill. Increasing the power input will result in greater work done on the particles with an expected decrease in particle size. The actual effect of changing these variables is to change the air velocity from the milling nozzles, which increases the accelerating force acting on the particles. The nozzle velocity found most effective in the Model 0202 air mill was in the range of about 900 to 1300 ft./sec. and preferably 1100 ft./sec. This velocity range combined with a controlled feed rate of 600 micron feed at 8 to 10 lbs. per hour, in the Model 0202 air mill, consistently produces a product of 15 to 30 microns, wet sieve size.

Adjustments of the feed rate, air pressure, and air volume can easily be made to obtain the desired particle size after size measurements have been made on the first batch of PTFE. These variables are not critical and are related to the size of the air mill, e.g., Model 010 "Jet-O-Mizer," having a feed capacity of ¼ to 15 lbs./hr., employs 20–25 s.c.f.m. (standard cubic ft./min.) of air at 25–110 p.s.i.g.; Model 0202 "Jet-O-Mizer," having a feed capacity of 1–100 lbs./hr., employs 70–100 s.c.f.m. of air at 25–110 p.s.i.g. and Model 0405 "Jet-O-Mizer," having a feed capacity of 100 to 1700 lbs./hr., employs 400–800 s.c.f.m. of air at 25–110 p.s.i.g.

The product, on molding, compresses under low pressure to a strong dense preform of a very low void content. pressures of 1000 to 2000 p.s.i. are all that are required to yield a preform of less than .1% voids. The superior unsintered flex strength, which is a measure of green preform strength, makes the product ideal for the production of large thin sheeting. On sintering the molded preforms readily coalesce to a dense uniform mass with little dimensional change. This low shrinkage is an indication of the consistency of physical properties along all dimensions. Extensive usage of the commercial ultrafine fibrous resin has been limited due to its high shrinkage on sintering. This has required the use of two sets of molds for fabrication of precision parts, which is not required for the novel product. Further, the commercial fibrous PTFE, on molding, derives a rough surface even at pressures in excess of 3000 p.s.i. A hot coining technique is required to achieve a surface smoothness of less than 100 microinches. By contrast, the PTFE of this invention has a surface gloss in molded objects even at low pressure. At a pressure of 500 p.s.i. a surface finish, without hot coining, of no greater than 82 microinches can be consistently obtained. Under the same conditions the ultrafine fibrous resin gives a surface finish of 100–250 microinches. Since extensive use is made of PTFE for anti-stick low friction surfaces, the uniformly smooth surface of this new PTFE is a distinct advantage in this particular instance. The fact that this surface finish can be achieved in a single operation, i.e., without hot coining, is also an advantage.

The product of this invention can be readily molded at low pressure to a dense uniform sheet, the uniformity of which is due to the tendency of this material to move or flow slightly under pressure without the application of heat. This property has been determined by the ability of a sample initially preformed under 400 p.s.i. to move or flow horizontally into an open recess when the pressure is increased to 2000 p.s.i. The average extension of the new PTFE is .079", measured after the sample is sintered. This measurement of mold flow is approximately 34% larger than the flow obtained when the commercial ultrafine fibrous resin is used. The improved mold flow of this material permits the healing of discontinuities in the sheet.

A study of the processes used for preparing ultrafine resins prior to this invention revealed that the milling was accomplished in either some form of hammer mill which gave a shearing action and resulted in a fibrous particle or in a circular air mill, typically, the "Micronizer," manufactured by the Sturtevant Mill Company of Boston, Mass. The type of product produced by the circular air mill does not have the high green preform strength of the new PTFE and has other shortcomings caused by excessive wall impact. The "Micronizer" has a grinding chamber, which can be described as a hollow horizontal toroid. The grinding and classifying take place in the same area, which is defined by a circular path, causing excessive wall impact resulting in a high degree of abrasion.

To summarize the properties of the product of this invention, ultrafine PTFE comprises a non-fibrous and porous material having: a low anisotropic expansion, i.e., a low shrinkage value; a high bulk density; a high green preform strength; a superior surface smoothness after sintering; and an improved mold flow. Further, the product avoids fragility in large thin sheets, which fragility causes extensive scrap reworking due to cracking on removal from the mold; has improved handling properties over the ultrafine fibrous commercial PTFE, giving a more uniform filling of molds; and the particles do not agglomerate. In addition, the particle size distribution as measured in terms of distribution function covers a consistently more narrow range than those particles prepared by other forms of milling, and the tensile strength, yield strength, percent elongation, and compression ratio are exemplary.

Desired ranges with respect to the properties of the novel PTFE are as follows: particle size, wet-sieve: 5 to 50 microns and, preferably, 15 to 30 microns; distribution function: 0.20 to 0.40; sub-sieve size 2.5 to 5.0 microns and, preferably, 2.5 to 4.0 microns; ratio wet-sieve size/subsieve size: 2.0 to 10; unsintered flex strength: 860 to 1100 p.s.i.; tensile strength: 4000 to 5400 p.s.i.; percent elongation: 300 to 450 and, preferably, 350 to 450; anisotropic expansion factor: 1.08 to 1.13; dielectric strength: 1200 to 1700 volts/mil and, preferably 1400 to 1700 volts/mil; and surface roughness: 40 to 82 microinches at 500 p.s.i. and 15 to 32 microinches at 2000 p.s.i. There is no lower limit for percent void content since it is undetectable by existing techniques.

The ultrafine PTFE produced in the "Jet-O-Mizer" was compared with ultrafine PTFE produced by three hammer mills. 600 micron commercial grade PTFE was used in the comparision illustrated in Table I, which is a summary of the results obtained.

The ultrafine PTFE produced in the "Jet-O-Mizer" was also compared with ultrafine PTFE produced by the circular air mill. Three different batches of 600 micron commercial grade PTFE were used in each mill to provide the comparative figures illustrated in Table II.

The results in both tables were determined according to the property definitions set forth, supra. The "Jet-O-Mizer" used was Model 0202.

The properties of the ultrafine PTFE are further illustrated in Examples I–V.

EXAMPLE I 8 pounds of commercial PTFE having a particle size of 600 microns were milled at 8–10 pounds per hour in "Jet-O-Mizer" Model 0202. 90 SCFM of air at 100 p.s.i. and at a temperature of 70° F. was used. The wet-sieve particle size of the product was 14.5 microns. The flex strength was measured to be 1078 p.s.i. and the anisotropic expansion was 1.11. Examination of the material under a microscope at 200× revealed a material comprising non-fibrous, porous, particles with rounded contours.

EXAMPLE II

Another commercial PTFE, prepared by a different company having a particle size of 600 microns, designated hereinafter as A, and the 600 micron PTFE of Example I, designated hereinafter as B were separately milled in a "Jet-O-Mizer" Model 0405. 670 s.c.f.m. of air at 90 p.s.i.g. and a temperature of 70° F. was used. The feed rate for both materials was 150 lbs. per hour. The results are shown below compared with the properties of a commercial ultrafine fibrous PTFE resin, designated hereinafter as C.

| Physical properties | A | B | C |
|---|---|---|---|
| Particle size (wet-sieve), microns | 26.8 | 21.9 | 47 |
| Flex strength (unsintered), p.s.i. | 860 | 901 | ¹ 646 |
| Anisotropic expansion | 1.13 | 1.12 | 1.16–1.28 |
| Dielectric strength, v./mil | 1,470 | 1,440 | 1,300–1,700 |

¹ Average.

EXAMPLE III

Three samples each of material A and material B of Example II were air milled in a "Micronizer" air mill. Flex strength measurements revealed a lower maximum value as compared to the minimum value from the elongated toroid air mill. The results are as follows:

| A, Flex strength (p.s.i.) | B, Flex strength (p.s.i.) |
|---|---|
| 720 | 600 |
| 686 | 686 |
| 737 | 698 |

The highest flex strength achieved for the circular air mill material was 737 p.s.i. whereas the lowest flex strength for the elongated toroid air milled material was 860 p.s.i. Seven samples of material C were evaluated for flex strength, the range of values being from 586 p.s.i. to 726 p.s.i., the average being 646 p.s.i. The highest flex strength was considerably less than the lowest flex strength for the elongated toroid air milled material.

EXAMPLE IV

The product prepared by using material B and the process of Example I was used in this example. Four gram samples were preformed at 400 p.s.i. in an anisotropic expansion mold. The specimens were then removed and a plate with a recess installed. The pressure was increased to 2000 p.s.i. and held for 3 minutes. They were then removed, sintered, and the mold extension measured.

|  | Mold extension, in. |
|---|---|
| Sample 1 | .066 |
| Sample 2 | .094 |
| Sample 3 | .077 |

EXAMPLE V

The same material used in Example IV was molded at 500 p.s.i. into thin sheets. The sheets were sintered and the surface smoothness measured by means of a Brush Surfindicator, manufactured by the Brush Instrument Division of Clevite Corp., Cleveland, Ohio. This property is important in the use of PTFE sheeting for low friction applications.

|  | Microinches |
|---|---|
| Sample 1 | 47 |
| Sample 2 | 73 |
| Sample 3 | 82 |
| Sample 4 | 42 |
| Average | 61 |

I claim:
1. A method for preparing polytetrafluoroethylene adapted for molding precision parts and thin sheeting,

TABLE I

| Mill used | Description of mill | Particle size (in microns) | Process restrictions | Unsintered flex strength | Anisotropic expansion | Surface roughness (500 p.s.i.) microinches | Mold extension (inches) | Tensile and/or dielectric strengths |
|---|---|---|---|---|---|---|---|---|
| "Jet-O-Mizer" | Elongated toroid shaped air mill | 5–50; non-fibrous | None | 860–1,100 | 1.08–1.13 | 42–82 | 1.079 | 4,410–4,720 p.s.i.; 1,230–1,470 v./mil. |
| "Fitz" ² | High speed hammer mill with perforated screen to control particle size | 50–125; fibrous | High power requirements, large heat evolution, low production rate | (³) | 1.15–1.17 |  |  | 3,800 p.s.i. |
| "Mikro-Atomizer" ⁴ | Air swept hammer mill with internal classification | >30; fibrous | Large heat evolution, coolant required | | 1.16 | | | 3,500 p.s.i. |
| "Hurricane" ⁵ | do | do | Large heat evolution | 586–726 | 1.16–1.28 | 100–250 | 1.059 | 3,500–4,200 p.s.i.; 1,300–1,700 v./mil. |

¹ Average.
² Manufactured by Pulverizing Machinery Co. of Summit, New Jersey.
³ Poor due to large particle size.
⁴ Manufactured by Pulverizing Machinery Co. of Summit, New Jersey.
⁵ Manufactured by the Microcyclomat Company of Minneapolis, Minn.

TABLE II

| | "Jet-O-Mizer" | | | "Micronizer" | | |
|---|---|---|---|---|---|---|
| Batch Number | (1) | (2) | (3) | (1) | (2) | (3) |
| Particle size (wet-sieve) | 16 | 11.2 | 14.3 | 30 | 20.7 | 20.7 |
| Distribution function | .39 | .38 | .37 | .43 | .41 | .42 |
| Fischer sub-sieve | 3.21 | 2.85 | 3.24 | 5.6 | 3.81 | 4.58 |
| Ratio wet sieve/sub-sieve | 5.0 | 3.93 | 4.4 | 5.4 | 5.4 | 4.5 |
| Specific gravity | 2,168 | 2.167 | 2,166 | 2,151 | 2.163 | 2,162 |
| Tensile strength | 4,720 | 4,410 | 4,700+ | 3,880 | 3,320 | 3,980 |
| Field strength | 2,080 | 1,740 | 1,660 | 2,090 | 1,540 | 1,660 |
| Percent elongation | 390 | 350 | 430 | 330 | 330 | 350 |
| Surface roughness | 32 | 27 | 31 | 43 | 37 | 37 |
| Anisotropic expansion | 1.11 | 1.13 | 1.12 | 1.09 | 1.10 | 1.10 |
| Compression ratio | 6.2 | 6.5 | 6.0 | 5.5 | 5.5 | 6.0 |

⁴ Manufactured by Fitzpatrick Company of Chicago, Illinois comprising the sequential steps of (a) subjecting particles of polytetrafluoroethylene, which particles are at least 100 microns in their smallest dimension, to milling effected substantially solely by interparticulate collision, at a temperature of less than about 200° F.; (b) classifying the milled particles to separate therefrom particles having a maximum dimension of up to and including about 50 microns, wet-sieve size; and (c) subjecting the unseparated particles of larger than about 50 microns, wet-sieve size, repeatedly to the milling effected substantially solely by interparticulate collision, at a temperature of less than about 200° F.

2. Ultrafine polytetrafluoroethylene adapted for molding precision parts and thin sheeting comprising porous, non-fibrous particles with rounded contours having a particle size, wet sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10; having upon molding to a zero void content at 6,000 p.s.i., an unsintered flex strength of at least 860 p.s.i.; and, having, after sintering, a tensile strength of no less than about 4000 p.s.i., a percent elongation of no less than about 300, an anisotropic expansion factor of no greater than about 1.13, a dielectric strength of no less than about 1200 volts per mil, a surface roughness of no greater than about 82 microinches at 500 p.s.i. and no greater than 32 microinches at 2000 p.s.i. and a percent void content of no greater than 0.1% at pressures greater than 2000 p.s.i.

3. A method for preparing polytetrafluoroethylene adapted for molding precision parts and thin sheeting, comprising the sequential steps of (a) subjecting particles of polytetrafluoroethylene, which particles are at least 100 microns in their smallest dimension, to milling effected by at least 90% interparticulate collision, at a temperature of less than about 200° F.; (b) classifying the milled particles to separate therefrom particles having a maximum dimension of up to and including about 50 microns, wet-sieve size; and (c) subjecting the unseparated particles of larger than about 50 microns, wet-sieve size, repeatedly to the milling effected by at least 90% interparticulate collision, at a temperature of less than about 200° F.

4. The method according to claim 3 in which the milling which is carried out in accordance with steps (a) and (c) is effected by greater than 94% interparticulate collision.

5. The method according to claim 3 in which the polytetrafluoroethylene prepared comprises porous, non-fibrous particles with rounded contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10; having, upon molding to a zero void content at 6,000 p.s.i., by an unsintered flex strength of at least 860 p.s.i.; and, after sintering, an anisotropic expansion factor of no greater than about 1.13.

6. A method for preparing polytetrafluoroethylene adapted for molding precision parts and thin sheeting, comprising the sequential steps of (a) subjecting particles of polytetrafluoroethylene, which particles are at least 100 microns in their smallest dimension, to milling in a mill having the shape of an elongated hollow toroid, at a temperature of less than about 200° F.; (b) classifying the milled particles to separate therefrom particles having a maximum dimension of up to and including about 50 microns, wet-sieve size; (c) subjecting the unseparated particles of larger than about 50 microns, wet-sieve size, repeatedly to the milling effected in the mill having the shape of an elongated hollow toroid, at temperature of less than about 200° F.

7. The method according to claim 6 in which the polytetrafluoroethylene prepared comprises porous, non-fibrous particles with rounded contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10; having, upon molding to a zero void content at 6,000 p.s.i., an unsintered flex strength of at least 860 p.s.i.; and, after sintering, an anisotropic expansion factor of no greater than about 1.13.

8. A method for preparing polytetrafluoroethylene adapted for molding precision parts and thin sheeting, comprising the sequential steps of (a) subjecting particles of polytetrafluoroethylene, which particles are at least 100 microns in their smallest dimension, to milling effected substantially solely by interparticulate collision in a mill having a shape of an elongated hollow toroid, at a temperature of less than about 200° F.; (b) classifying the milled particles to separate therefrom particles having a maximum dimension of up to and including about 50 microns, wet-sieve size; (c) subjecting the unseparated particles of larger than about 50 microns, wet-sieve size, repeatedly to the milling effected substantially solely by interparticulate collision in the mill having the shape of an elongated hollow toroid, at temperature of less than about 200° F.

9. A method according to claim 8 in which the milling carried out in the elongated hollow toroid in accordance with steps (a) and (c) is effected by greater than 94% interparticulate collision.

10. The method according to claim 8 in which the milling carried out in the elongated hollow toroid in accordance with steps (a) and (c) is effected by at least 90% interparticulate collision.

11. The method according to claim 10 in which the polytetrafluoroethylene prepared comprises porous, non-fibrous particles with roundede contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10; having, upon molding to a zero void content at 6,000 p.s.i., an unsintered flex strength of at least 860 p.s.i.; and, after sintering, an anisotropic expansion factor of no greater than about 1.13.

12. The method according to claim 1 in which the polytetrafluoroethylene prepared comprises porous, non-fibrous particles with rounded contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10 and having, upon molding to a zero void content at 6,000 p.s.i., an unsintered flex strength of at least 860 p.s.i.

13. The method according to claim 12 in which the polytetrafluoroethylene prepared has, after sintering, an anisotropic expansion factor of no greater than about 1.13.

14. A method for preparing polytetrafluoroethylene adapted for molding precision parts and thin sheeting, comprising the sequential steps of (a) subjecting particles of polytetrafluoroethylene, which particles are at least 100 microns in their smallest dimension, to milling effected by at least 90% interparticulate collision, at a temperature of less than about 200° F.; (b) classifying the milled particles to separate therefrom particles having a maximum dimension of up to and including about 50 microns, wet-sieve size; and (c) subjecting the unseparated particles of larger than about 50 microns, wet-sieve size, repeatedly to the milling effected by at least 90% interparticulate collision, at a temperature of less than about 200° F. to produce a product comprising porous, non-fibrous particles with rounded contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10; having, upon molding to a zero void content at 6,000 p.s.i., an unsintered flex strength of at least 860 p.s.i.; and, having, after sintering, a tensile strength of no less than about 4000 p.s.i., a percent elongation of no less than about 300, an anisotropic expansion factor of no greater than about 1.13, a dielectric strength of no less than about 1200 volts per mil, a surface roughness of no greater than about 82 microinches at 500 p.s.i., and no greater than 32 microinches at 2000 p.s.i. and a percent void content of no greater than 0.1% at pressures greater than 2000 p.s.i.

15. A method according to claim 14 in which the milling which is carried out in accordance with steps (a) and (c) is effected by greater than 94% interparticulate collision.

16. Ultrafine polytetrafluoroethylene adapted for molding precision parts and thin sheeting comprising porous, non-fibrous particles with rounded contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10 and having upon molding to a zero void content at 6,000 p.s.i., an unsintered flex strength of at least 860 p.s.i.

17. Ultrafine polytetrafluoroethylene adapted for molding precision parts and thin sheeting comprising porous, non-fibrous particles with rounded contours having a particle size, wet-sieve, no greater than 50 microns, said polytetrafluoroethylene material having a distribution function of no greater than about .40, a sub-sieve size of no greater than about 5.0 microns, a ratio of wet-sieve size to sub-sieve size in the range of about 2 to about 10; having, upon molding to a zero void content at 6,000 p.s.i., an unsintered flex strength of at least 860 p.s.i.; and having, after sintering, an anisotropic expansion factor of no greater than about 1.13.

References Cited

UNITED STATES PATENTS

| | | | |
|---|---|---|---|
| 2,936,301 | 5/1960 | Thomas et al. | 266—92.1 |
| 3,178,121 | 4/1965 | Wallace | 241—18 X |

JOSEPH L. SCHOFER, Primary Examiner

W. F. HAMROCK, Assistant Examiner

U.S. Cl. X.R.

241—23

PO-1050
(5/69)

UNITED STATES PATENT OFFICE
CERTIFICATE OF CORRECTION

Patent No. 3,640,984                    Dated February 8, 1972

Inventor(s) William A. Miller

It is certified that error appears in the above-identified patent and that said Letters Patent are hereby corrected as shown below:

Column 2, line 27, "day" should be --way--.

Column 2, line 67, "paritcle" should be --particle--.

Column 3, line 24, "hte" should be --the--.

Column 3, line 25, delete the word "are".

Column 3, line 30, after the word "then" insert --the--.

Column 5, line 26, "stage" should be --range--.

Column 7, Example II, Under "C", "47" should be --37--.

Column 8, Table II, under "Batch Number", "Field" should be --Yield--.

Claim 11, line 3, "roundede" should be --rounded--.

Claim 5, line 9, delete "by".

Signed and sealed this 11th day of July 1972.

(SEAL)
Attest:

EDWARD M. FLETCHER, JR.
Attesting Officer

ROBERT GOTTSCHALK
Commissioner of Patents